United States Patent [19]

Floyd, Jr.

[11] 3,708,873
[45] Jan. 9, 1973

[54] CIRCULAR WAVEGUIDE JOINT
[75] Inventor: Edwin Floyd, Jr., Harrisburg, Pa.
[73] Assignee: AMP Incorporated, Harrisburg, Pa.
[22] Filed: June 11, 1970
[21] Appl. No.: 45,459

Related U.S. Application Data

[63] Continuation-in-part of Ser. No. 865,229, Sept. 22, 1969, Pat. No. 3,560,029, which is a continuation-in-part of Ser. No. 631,841, April 18, 1967, Pat. No. 3,365,681, which is a continuation-in-part of Ser. No. 468,793, July 1, 1965, abandoned.

[52] U.S. Cl....................................29/600, 29/428
[51] Int. Cl........................H01p 11/00, H01q 13/00
[58] Field of Search ........29/428, 407, 600; 285/146, 285/157

[56] References Cited

UNITED STATES PATENTS 2,054,118   9/1936   Childs ..................................29/428
2,160,263   5/1939   Fletcher ..............................285/146
2,161,568   6/1939   Gignoux ................................29/428
2,559,806   7/1951   Thompson............................285/157
3,255,521   6/1966   Callahan ..............................29/407

Primary Examiner—Charles W. Lanham
Assistant Examiner—D. M. Heist
Attorney—William J. Keating, Ronald D. Grefe, Gerald K. Kita, Frederick W. Raring, Jay L. Seitchik and John P. Vandenburg

[57] ABSTRACT

A circular waveguide connection with two grooved waveguide ends receiving thereover internally grooved rings of mating halves, a central alignment sleeve, each end of which sleeve is sealed by an elastomeric annulus, and a pressure ring associated with each annulus, the assembly covered with two mating flanged coupling members.

1 Claim, 3 Drawing Figures

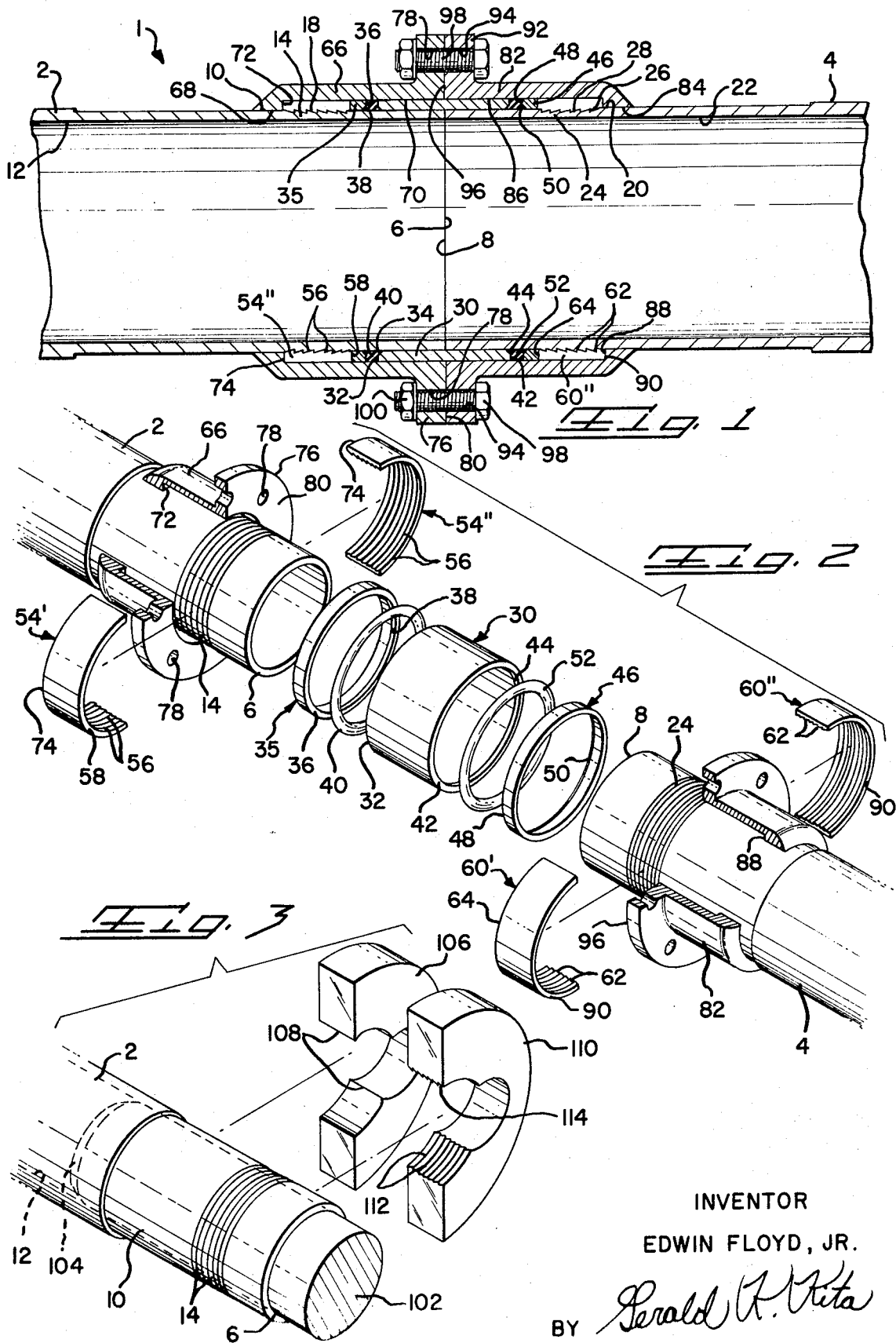

CIRCULAR WAVEGUIDE JOINT

CROSS REFERENCE TO RELATED APPLICATION

This application is a continuation-in-part application of Ser. No. 865,229, filed Sept. 22, 1969 now U.S. Pat. No. 3,560,029, which is a continuation-in-part application of Ser. No. 631,841, filed Apr. 18, 1967 now U.S. Pat. No. 3,365,681, which is a continuation-in-part of Ser. No. 468,793, filed July 1, 1965, now abandoned.

FIELD OF THE INVENTION

This invention relates to a mechanical connection for abutting, precisely aligned sections of interconnected tubular members, such as circular waveguide tubes.

BACKGROUND OF THE PRIOR ART

Heretofore, interconnection of circular wave-guide sections was accomplished by welding or soldering a flange on each terminal end of abutting sections. The heat generated to effect the fastening of the flanges created distortion on the interior cylindrical dimensions of the waveguide tubes requiring plating or other operations to restore concentricity thereof. Other flange fastening techniques involved swaging the waveguide tubing ends to accommodate the flanges to be attached thereto. This operation also tended to distort the interior dimensions of the tubing seriously limiting effectiveness of the waveguide.

SUMMARY OF THE INVENTION

The present invention provides a method and apparatus for fabricating a joint for interconnecting together abutting, aligned circular waveguide tubing portions. The joint is effected without complex tooling or heavy press equipment, and it includes a technique for positively maintaining a desired internal tube cylindrical configuration thereby eliminating additional processes necessary to insure critical interior dimensional requirements characteristic of circular waveguide tubing.

OBJECTS OF THE INVENTION

It is therefore a primary object of the present invention to provide a joint for cylindrical waveguide tubing which obviates the disadvantages inherent in prior art tubing connection techniques.

Another object of the invention is to provide a method and apparatus for providing a mechanical joint for cylindrical waveguide tubing sections.

A further object of the invention is to provide a cylindrical waveguide tubing joint which positively prevents distortion of the tubing during fabrication of the joint.

A still further object of the present invention is to provide a waveguide joint secured to waveguide tubing portions without the aid of either swaging or welding.

Still an additional object of the invention is to provide a circular waveguide joint in which abutting aligned portions of the waveguide are disposed and secured in aligned positions within a surrounding housing.

Other objects and many attendant advantages of the present invention will become apparent upon perusal of the following detailed description of the preferred embodiments taken in conjunction with the accompanying drawings.

BRIEF DESCRIPTION OF THE DRAWINGS

FIG. 1 is an enlarged cross section of the preferred embodiment of the completed waveguide joint securing together in abutting relationship the end portions of cylindrical waveguide tubing portions.

FIG. 2 is an exploded perspective with parts partially in section to illustrate details of the preferred embodiment illustrated in FIG. 1.

FIG. 3 is a fragmentary perspective with parts partially in section to illustrate preparation of the tubing end portion during connection of a flange thereto.

DETAILED DESCRIPTION OF THE PREFERRED EMBODIMENT

With more particular reference to the drawings, there is illustrated in FIG. 1, a waveguide joint according to the invention illustrated generally at 1. The joint is characterized by a pair of end-to-end abutting axially aligned cylindrical waveguide tubing portions 2 and 4, the terminal ends 6 and 8, respectively, are abutting. The end portion of the tubing 2 is provided with a reduced external diameter portion 10 created by removal of tubing material sufficient to provide a right-cylindrical configuration for the tubing end portion. Accordingly, the illustrated reduction in diameter is greatly exaggerated for the purposes of clarity, whereas an actual practice, the reduction would not appear as great. Such reduction also is provided to obtain concentricity of the external tubing dimension with that of the interior diameter 12. A reduced diameter end portion 10 is provided with a plurality of external serrations 14. Each serration is configured with a radially extending sidewall portion 16 completely encircling the tubing exterior and an adjacent sidewall 18 included with respect to the longitudinal dimension of the tubing and extending circumferentially around the tubing adjacent to the sidewall 16.

In similar fashion to the configuration of the tubing 2, the tubing 4 is provided with a reduced diameter end portion 20 concentric with that of the interior diameter 22 of the tubing 4. The reduced diameter portion 20 is provided externally thereof with a plurality of serrations 24, each serration characterized by a radial sidewall 26 encircling the tubing 4 and a sidewall 28 adjacent to the sidewall 26 completely encircling the tubing 4. The sidewall 28 additionally is inclined with respect to the longitudinal axis of the tubing 4.

To complete the joint, the abutting ends 6 and 8 are encircled by a surrounding alignment sleeve 30, which maintains the tubing portions 2 and 4 in axial abutting alignment. The sleeve 30 is generally cylindrical and extends in encircling engagement with the reduced diameter portions 10 and 20 of the respective tubing portions 2 and 4. The cylindrical end portion 32 of the sleeve 30 which encircles the tubing portion 2 is provided thereon with an interior annular chamfer 34. A gasket ring having substantially the same thickness as the cylindrical sleeve 30 has a cylindrical end 36 provided with an interior annular chamfer 38, which chamfer is in opposed spaced relationship to the chamfer 34 of the sleeve 30. An annular resilient sealing gasket 40 is disposed between the sleeve and the ring 35.

In similar fashion, the cylindrical end 42 of the sleeve which encircles the tubing portion 4 is provided thereon with an interior annular chamfer 44 and annular gasket ring 46 of the same thickness as the sleeve 30 has an end portion 48 which is provided with an interior chamfer 50 in adjacent spaced relationship from the chamfer 44 of the sleeve 30. An annular sealing resilient gasket 52 is disposed between the sleeve 30 and the gasket ring 46 in encircling relationship with respect to the tube portion 4.

As shown in FIG. 1, the tubing portion 2 is encircled by a metallic ring 54 generally of the same thickness as the sleeve 30 and provided interiorly thereof with a plurality of serrations 56 which are particularly configured to matingly engage with respective serrations 14 above the reduced diameter portion 10. The sleeve 54 is provided with a cylindrical end portion 58 adapted to matingly engage against a corresponding cylindrical end portion of the ring 35. In similar fashion, a metallic ring 60 encircles the reduced diameter portion 20 of the tubing portion 4. The ring 60 is provided interiorly thereof with a plurality of serrations 62 which are configured to matingly engage the serrations 24. A cylindrical end portion 64 of the ring 60 impinges against a corresponding cylindrical end of the gasket ring 46. As shown in FIG. 2, the ring 54 may be fabricated in a split ring configuration. More particularly, the ring 54 may be fabricated from a half cylindrical portion 54' and another half cylindrical portion 54'' which half cylindrical portions may be engaged in abutting encircling relationship about the serrations 14 on the reduced diameter portion 10 of the tube. In similar fashion, the ring 60 may be fabricated from half cylindrical portions 60' and 60'' which matingly engage in encircling relationship over the serrations 24 of the reduced diameter portion 20 of the tubing 4.

As shown in FIGS. 1 and 2, an outer generally cylindrical housing 66 is provided with a reduced diameter portion 68 adapted to encircle and engage the reduced diameter portion 10 of the tube portion 2. The housing 66 is further provided with a relatively enlarged internal diameter portion 70 adjacent to the internal diameter portion 68 and adapted to engage and encircle the cylindrical outer peripheries of the ring 54, the gasket ring 35, and a portion of the sleeve 30. Additionally, a radially extending annular shoulder is provided between the diameter portion 68 and 70 which engages in compression upon the cylindrical end 74 of the ring 54. The housing 66 terminates in an annular protruding flange provided with a plurality of circumferentially spaced reduced diameter bores 78. The flange 76 terminates in a generally annular end wall 80 which, as shown in FIG. 1, is in alignment with the end 6 of the tube portion 2. In similar fashion, a housing 82 is provided with a reduced diameter portion 84 which engages and encircles the reduced diameter portion 20 of the tubing portion 4. A relatively enlarged diameter portion 86 is provided interiorly of the housing 82 and is adapted to engage and encircle the outer cylindrical peripheries of the ring 60, the gasket ring 46 and a portion of the sleeve 30. An annular shoulder 88 is defined between the diameter portions 84 and 86, which shoulder compressably engages on an end wall 90 of the ring 60. The housing terminates in an enlarged annular projecting flange 92 having a plurality of circumferentially spaced reduced diameter bores 94 therein, which bores 94 are adapted to be respectively aligned with corresponding bores 78 in the flange 76. The flange 92 is provided with an annular end wall 96 in alignment with the end 8 of the tube portion 4, which end wall 96 is adapted to matingly engage in abutting relationship the end wall 80 of the flange 76. A threaded bolt 98 is received in each pair of the aligned bores 78 and 94, and a nut 100 is secured threadably to each bolt 98. Upon tightening of the nuts 100, the shoulders 72 and 88 respectively compress upon the end walls 74 and 90 causing the ring serrations 56 and 62 to positively grip and seat in mating engagement with the serrations 14 and 24 respectively. Additionally, such action compresses the gasket rings 35 and 46 against the respective sealing rings 32 and 52. Accordingly, the sealing ring 40 is compressed by the chamfers 38 and 34 into sealing engagement against the reduced diameter portion 10 of the tube portion 2. Additionally, the gasket 40 is compressed between the walls 32 and 36 into sealing engagement against the inner diameter 70 of the housing 66. In similar fashion, the gasket 52 is compressed between the chamfers 44 and 50 into sealing engagement against the reduced diameter portion 20 of the tube portion 4. The gasket 52 is additionally compressed between the end walls 42 and 48 into sealing engagement with the internal diameter portion 86 of the housing 92.

With reference to FIG. 3 of the drawings, fabrication of the tube portion 10 is particularly illustrated. As shown in the Figure, a portion of a cylindrical mandrel 102 is shown with a tapered head portion 104 which is inserted into the inner diameter 12 of the tube portion 2. The mandrel 102 maintains the interior dimensions and alignment of the tube portion 2 while a first cutting 112 106 provided with a plurality of internal scraping knives 108 is followed along the mandrel 102 according to any well known technique, to remove away exterior circumferential portions of the tube portion 2 resulting in the reduced diameter portion 10. As heretofore explained, the reduced diameter portion 10 is shown greatly exaggerated whereas, in actual practice, only sufficient material is removed to provide concentricity of the reduced diameter portion 10 with that of the interior diameter 12. Subsequent to this operation, a second cutting die 110 provided with a plurality of generally cutting surfaces 112 is further provided with a stop shoulder 114. In operation, the die 110 is urged to follow longitudinally along the mandrel 102, according to any well known technique, until the stop shoulder 114 engages the end 6 of the tubing portion 2. The cutting surfaces reduced are then radially urged to bite into the reduced diameter portion 10, according to any well known technique, and thereby form simultaneously the plurality of serrations 14. Accordingly, upon removal of the mandrel 102, the tube portion 2 is adapted to be joined particularly in the manner shown and described according to FIGS. 1 and 2 of the drawings. The purpose of the manual 102 is to maintain the interior dimensions of the diameter 12 while the tube portion 2 is being prepared by the cutting dies 106 and 110. In similar fashion, the tube portion 4 may be prepared and fabricated in the particular manner shown in FIG. 3.

Thus, according to the techniques and the structure particularly shown and described, cylindrical waveguide tubing portions may be joined in end-to-end aligned relationship by a mechanical joint which involves a minimum of effort in labor and which does not interfere with efficiency of the waveguide. Other modifications of the invention are possible. For example, the tubing portion 4 and associated housing 92 may be replaced with a bulkhead thereby enabling connection of the tubing portion 2 against a bulkhead structure rather than connected in end-to-end relationship with another tubing portion.

What is claimed is:

1. A method of providing a tubular waveguide with a connecting flange, which comprises the steps of:
   a. providing a tubular waveguide;
   b. reducing the outer diameter of a section of the waveguide adjacent one end, such reduced diameter being constant across said section;
   c. serrating a portion of said reduced diameter section, said portion being removed from said end of said waveguide;
   d. providing a housing having a sleeve and a laterally extending flange;
   e. sliding said housing onto said waveguide beyond said serrations;
   f. placing internally serrated half-sleeves around said serrations on said waveguide;
   g. sliding a resilient gasket onto said waveguide abutting said gasket against said half-sleeves;
   h. sliding said housing forward on said waveguide until said flange is in alignment with said end of said waveguide, thereby enclosing said half-sleeves and said gasket; and
   i. inserting an alignment sleeve in between said housing and said waveguide until said sleeve abuts against said gasket.

* * * * *